(12) United States Patent
Fatih et al.

(10) Patent No.: US 9,478,317 B2
(45) Date of Patent: Oct. 25, 2016

(54) PRESSURIZER SURGE-LINE SEPARATOR FOR INTEGRAL PRESSURIZED WATER REACTORS

(75) Inventors: Aydogan Fatih, Monroeville, PA (US); Alexander W. Harkness, Gibsonia, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 871 days.

(21) Appl. No.: 13/476,191

(22) Filed: May 21, 2012

(65) Prior Publication Data

US 2013/0308740 A1  Nov. 21, 2013

(51) Int. Cl.
*G21C 15/00* (2006.01)
*G21C 1/09* (2006.01)
*G21C 1/32* (2006.01)

(52) U.S. Cl.
CPC ............. *G21C 15/00* (2013.01); *G21C 1/09* (2013.01); *G21C 1/322* (2013.01); *Y02E 30/32* (2013.01)

(58) Field of Classification Search
CPC .................................. G21C 1/08; G21C 1/09
USPC .................................. 376/347, 361, 395, 399
See application file for complete search history.

(56) References Cited

U.S. PATENT DOCUMENTS

| | | | |
|---|---|---|---|
| 2,990,349 A | | 6/1961 | Roman |
| 3,253,999 A | | 5/1966 | Weisman |
| 3,284,311 A | | 11/1966 | McHugh |
| 3,312,596 A | | 4/1967 | Grain |
| 4,329,234 A | * | 5/1982 | Cikut et al. .................. 210/752 |
| 4,654,185 A | | 3/1987 | Drake |
| 4,788,032 A | | 11/1988 | Baujat et al. |
| 2012/0076254 A1 | | 3/2012 | Malloy et al. |

FOREIGN PATENT DOCUMENTS

| | | |
|---|---|---|
| CN | 85108864 | 6/1986 |
| CN | 87103198 | 10/1987 |
| JP | 2-240593 | 9/1990 |

OTHER PUBLICATIONS

WCAP-16062-NP Rev. 0, IRIS Plant Description Document, Mar. 21, 2003, Westinghouse Electric Company. attached excerpts: pp. 1-13-1-17, 3-1-3-2, 3-20, 3-48-3-49. full document available online: <https://adamswebsearch2.nrc.gov/webSearch2/main.jsp?AccessionNumber=ML031000401>.*
WCAP-16062-NP Rev. 0, IRIS Plant Description Document, Mar. 21, 2003, Westinghouse Electric Company, attached excerpts: pp. 1-13 thru 1-17, 3-1 thru 3-2, 3-20, and 3-48 thru 3-49. full document available online at http://adams.nrc.gov/wba/.*
International Search Report for PCT/US2013/040031 dated Sep. 24, 2013 (Form PCT/ISA/210).
Written Opinion of the International Searching Authority for PCT/US2013/040031 dated Sep. 24, 2013 (Form PCT/ISA/237).
International Preliminary Report on Patentability for PCT/US2013/040031 dated Dec. 4, 2014 (Forms PCT/IB/326, PCT/IB/373, PCT/ISA/237).
Westinghouse Electric Company LLC, EP 13794744.6 Search Report, Apr. 3, 2016, 7 pages.

* cited by examiner

*Primary Examiner* — Jack W Keith
*Assistant Examiner* — Lily C Garner
(74) *Attorney, Agent, or Firm* — Joseph C. Spadacene; Westinghouse Electric Company LLC

(57) ABSTRACT

An integral pressurized light water reactor having most of the components of a primary side of a pressurized water reactor nuclear steam supply system housed in a single pressure vessel with a pressurizer separated from the remaining reactor system by a surge separator having multiple layers of separated steel plates with a number of concentric baffles extending therebetween. A circuitous flow path is provided through and between the plates and concentric baffles and a relatively stagnant pool of coolant is maintained within an innermost zone between the plates to provide thermal isolation.

12 Claims, 11 Drawing Sheets

PRESSURIZER SURGE-LINE SEPARATOR FOR INTEGRAL PRESSURIZED WATER REACTORS

BACKGROUND

1. Field

This invention pertains generally to pressurizers for pressurized water reactors and more particularly to surge line separators for integral pressurized water reactors.

2. Related Art

In a nuclear reactor for power generation, such as a pressurized water reactor, heat is generated by fission of a nuclear fuel such as enriched uranium, and transferred into a coolant flowing through a reactor core. The core contains elongated nuclear fuel rods mounted in proximity with one another in a fuel assembly structure, through and over which the coolant flows. The fuel rods are spaced from one another in co-extensive parallel arrays. Some of the neutrons and other atomic particles released during nuclear decay of the fuel atoms in a given fuel rod pass through the spaces between fuel rods and impinge on fissile material in adjacent fuel rods, contributing to the nuclear reaction and to the heat generated by the core.

Moveable control rods are dispersed throughout the nuclear core to enable control of the overall rate of the fission reaction, by absorbing a portion of the neutrons passing between fuel rods, which otherwise would contribute to the fission reaction. The control rods generally comprise elongated rods of neutron absorbing material and fit into longitudinal openings or guide thimbles in the fuel assemblies running parallel to and between the fuel rods. Inserting a control rod further into the core causes more neutrons to be absorbed without contributing to fission in an adjacent fuel rod; and retracting the control rods reduces the extent of neutron absorption and increases the rate of the nuclear reaction and the power output of the core.

FIG. 1 shows a simplified conventional nuclear reactor primary system, including a generally cylindrical pressure vessel 10 having a closure head 12 enclosing a nuclear core 14 that supports the fuel rods containing the fissile material. A liquid coolant, such as water or borated water, is pumped into the vessel 10 by pump 16 through core 14 where heat energy is absorbed and is discharged to a heat exchanger 18 typically referred to as a steam generator, in which heat is transferred to a utilization circuit (not shown) such as the steam driven turbine generator. The reactor coolant is then returned to the pump 16 completing the primary loop. Typically, a plurality of the above described loops are connected to a single reactor vessel 10 by reactor coolant piping 20. A conventional pressurized water reactor typically has a separate pressurizer 22 connected to one of the reactor coolant loops that maintains the pressure of the system.

Commercial power plants employing this design are typically on the order of 1,100 megawatts or more. More recently, Westinghouse Electric Company LLC has proposed a small modular reactor in the 200 megawatt class. The small modular reactor is an integral pressurized water reactor with all primary loop components located inside the reactor vessel. Due to the arrangement of these components within the reactor vessel in this integral, modular reactor design, the traditional method for separating the pressurizer from a reactor coolant loop is not possible. Typical pressurized water reactors employ a surge line 32 connected between the pressurizer 22 and the piping in one of the reactor's coolant loops for this purpose. The pressurizer 22 controls whether coolant is added to the coolant loops or withdrawn from the coolant loops through the surge line to maintain the system's pressure within operating design limits. Thus, in a traditional pressurized water reactor nuclear steam supply system the pressurizer and the reactor are separate pressure vessels connected with a long section of pipe, i.e., the surge line 32. The surge line allows communication between the pressurizer and the remainder of the reactor coolant system which allows for fluctuation in reactor coolant system volume while providing physical separation between the warmer fluid of the pressurizer from the remainder of the reactor coolant. In integral reactor designs, a new method is required to establish the thermal separation that must be developed for the pressurizer to function as intended and also provide the surge function while being contained within the pressure boundary of the integral reactor vessel.

Accordingly, a new pressurizer interface is desired that will maintain physical separation between the pressurizer and the remainder of the reactor primary system within the reactor pressure vessel.

Further, such a new separation apparatus is desired that will provide thermal separation between the warmer fluid of the pressurizer and the remainder of the reactor coolant system.

Additionally, a new separation apparatus is desired that will satisfy the surge function while being contained within the pressure boundary of the integral reactor pressure vessel.

SUMMARY

These and other objectives are achieved by an integral nuclear reactor having a reactor pressure vessel housing, a primary coolant flow path and a pressurizer with a surge line separator separating the pressurizer from the primary coolant flow path. The surge line separator includes two or more spaced, generally horizontal plates, each having a curved periphery that is supported in an upper portion of the reactor pressure vessel with each plate substantially spanning the inside diameter of the reactor vessel. A plurality of spaced, curved, concentric baffles extend between the spaced plates with an upper one of the two spaced, generally horizontal plates attached to at least some of the baffles and a lower one of the two spaced, generally horizontal plates attached to at least others of the baffles. A first coolant passage extends through the lower one of the two spaced, generally horizontal plates in a first area generally proximate one of either a center or the periphery of the lower one of the two spaced, generally horizontal plates. A second coolant passage extends through the upper one of the two spaced, generally horizontal plates in a second area generally proximate the other of either a center or periphery of the upper one of the two spaced, generally horizontal plates. A circuitous coolant path extends between the first and second areas to provide access to the pressurizer positioned above the upper one of the two spaced, generally horizontal plates.

Preferably, the circuitous path is through an opening between adjacent ones of the baffles having substantially a same distance from the central axis of the reactor vessel. Desirably, the circuitous path is through a plurality of circumferentially spaced openings, each between an adjacent pair of the baffles having substantially the same distance from the central axis. In one embodiment, the circuitous coolant flow path is through a plurality of such openings radially spaced from each other and preferably the plurality of radially spaced openings that are adjacent each other are circumferentially offset. Desirably, the first coolant passage through the lower one of the two spaced, generally horizontal plates comprises a plurality of first coolant passages that are respectively offset from an adjacent opening. Similarly, it is desirable that the second coolant passage through the upper one of the two spaced generally horizontal plates comprise a plurality of second coolant passages that are circumferentially offset from an adjacent opening. Furthermore, it is preferable that an inner most one of the plurality of adjacent baffles having substantially the same distance from the central axis substantially surround a generally stagnant pool of coolant relative to the flow between the first area and the second area. In the latter embodiment the inner most baffles preferably include one or more coolant passages through an inner wall formed by the inner most baffles.

In another embodiment, the surge line separator comprises a plurality of pairs of the two spaced, generally horizontal plates with a set of the plurality of spaced, curved concentric baffles extending therebetween with the pairs of spaced, generally horizontal plates arranged in tandem. Preferably, in the latter embodiment the lower one of the two spaced generally horizontal plates of one pair forms the upper one of the two spaced, horizontal plates of a second pair.

In the preferred embodiment substantially all of the baffles are attached to only one of the two spaced, generally horizontal plates. Desirably, the pressurizer also includes a plurality of circumferentially spaced, radially extending heater assemblies which are supported from an upper side of the upper one of the two spaced, generally horizontal plates. Preferably a circumferential separation flange is provided in the reactor vessel at or below the upper one of the two, spaced, generally horizontal plates, wherein the flange is sealed by a plurality of axially extending circumferentially spaced fasteners and the heater assemblies respectively extend between pairs of the fasteners. Desirably, the pressurizer further includes a sealed manway substantially in the center of the upper one of the two spaced, generally horizontal plates.

BRIEF DESCRIPTION OF THE DRAWINGS

A further understanding of the invention claimed hereafter can be gained from the following description of the preferred embodiments when read in conjunction with the accompanying drawings in which:

DESCRIPTION OF THE PREFERRED EMBODIMENT

Figure 1:
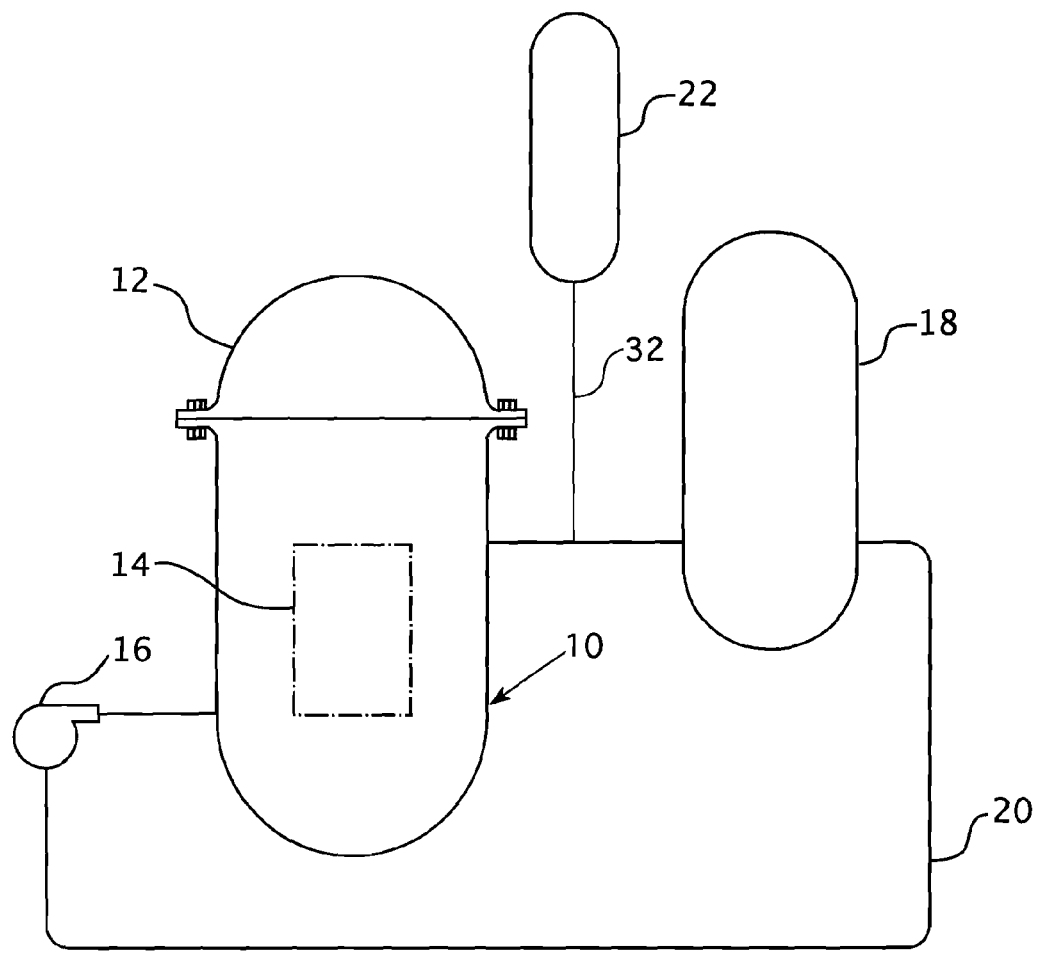
FIG. 1 is a simplified schematic of a conventional nuclear reactor system.
Figure 2:
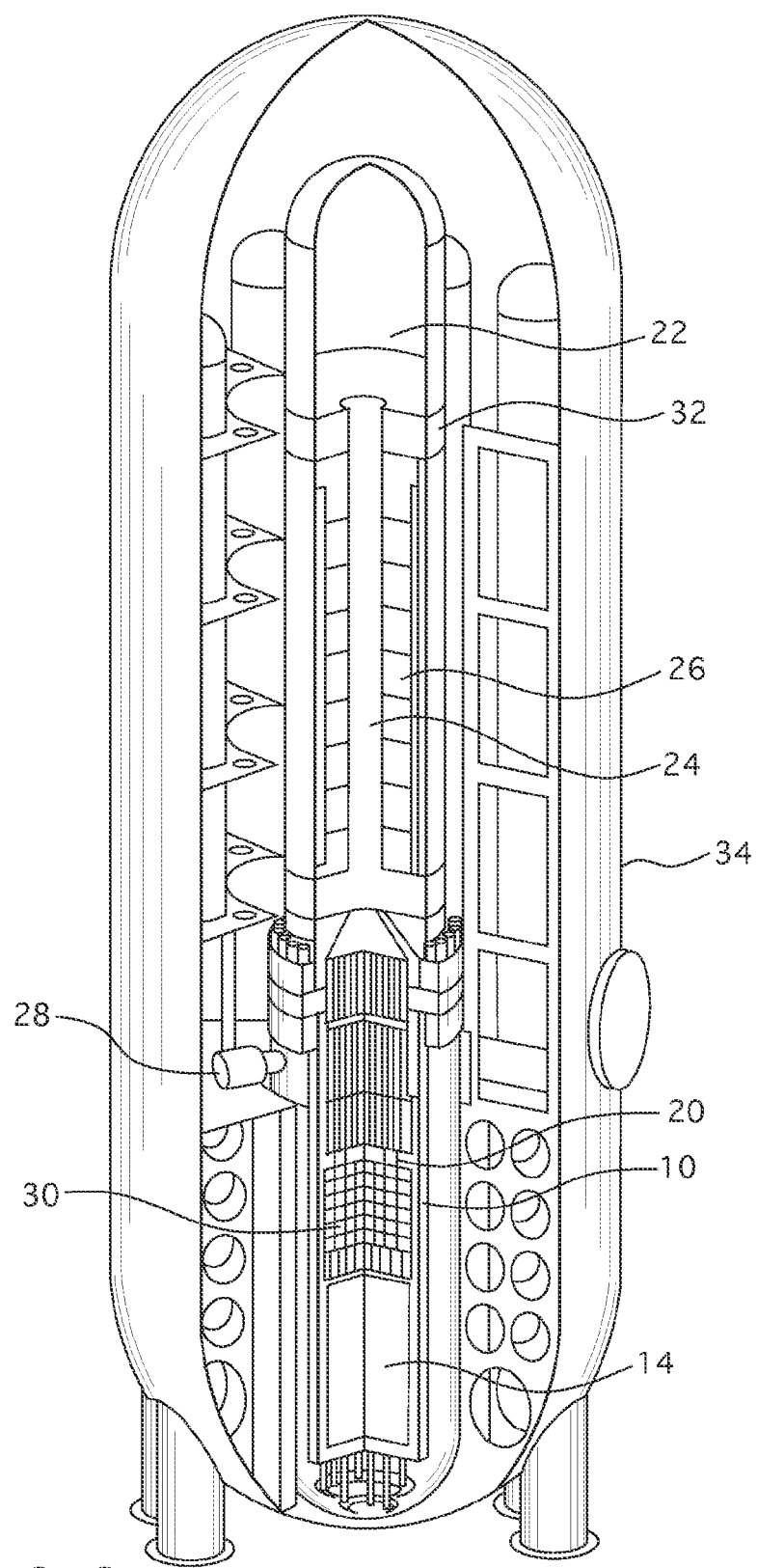
FIG. 2 is a perspective view, partially cut away, showing a small modular integral reactor system which may incorporate the benefit of this invention.
Figure 3:
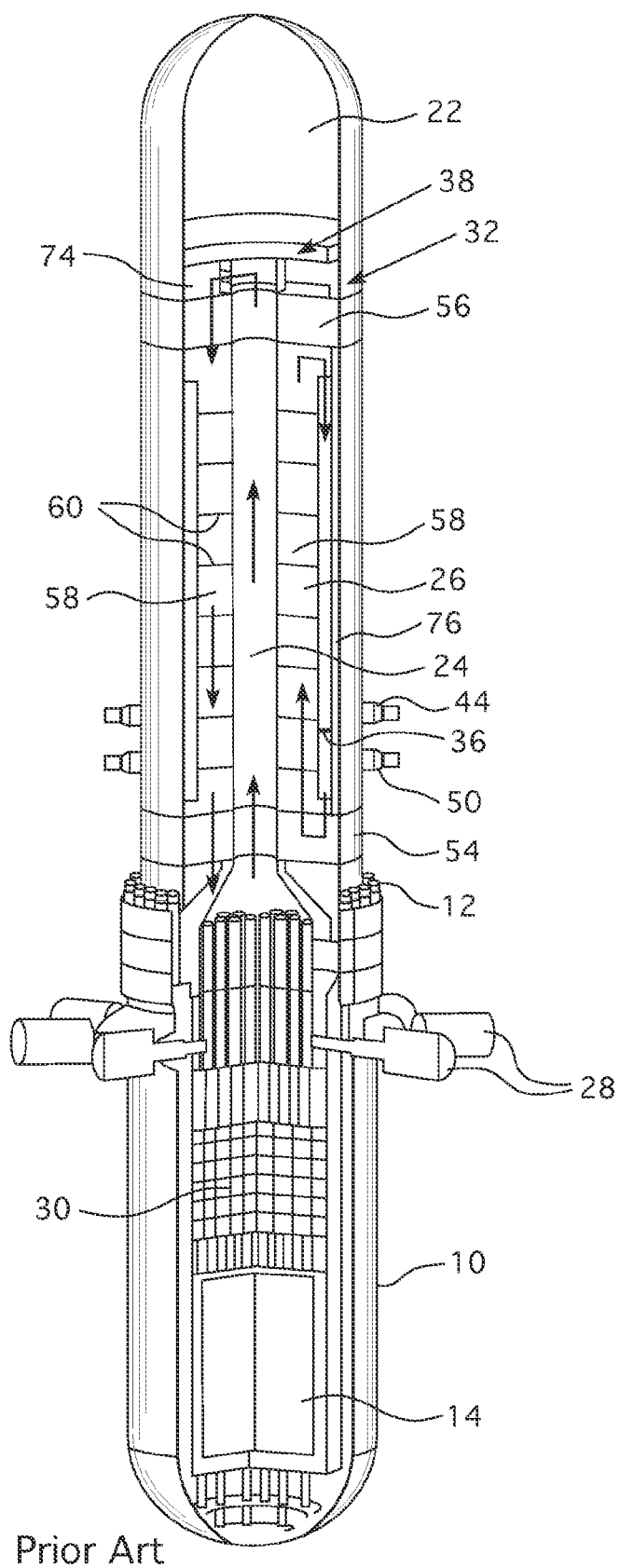
FIG. 3 is an enlarged view of the reactor shown in FIG. 2.

FIGS. 2 and 3 illustrate a small modular reactor design which can benefit from the surge separator design claimed hereafter. FIG. 2 shows a perspective view, partially cut away, to show the pressure vessel and its integral, internal components. FIG. 3 is an enlarged view of the pressure vessel shown in FIG. 2. Like reference characters are used among the several figures to identify corresponding components. The pressurizer 22 shown in FIGS. 2 and 3 above the surge separator 38 is of conventional construction and is integrated into the upper portion of the reactor vessel head 12 and eliminates the need for a separate component. A hot leg riser 24 which forms part of the hot leg of the reactor coolant primary loop, directs primary coolant from the core 14 to a heat exchanger 26 which surrounds the hot leg riser 24. A plurality of reactor coolant pumps 28 are circumferentially spaced around the reactor vessel at an elevation near the upper end of the upper internals 30. The reactor coolant pumps are horizontally mounted axial flow canned motor pumps. The reactor core 14 and the upper internals 30, except for their size, are substantially the same as the corresponding components in a conventional AP 1000® reactor, supplied by Westinghouse Electric Company LLC, Pittsburgh, Pa.

In an integral pressurized water reactor such as illustrated in FIGS. 2 and 3, all of the components typically associated with the primary side of a nuclear steam supply system are contained in a single pressure vessel 10 that is typically housed within a containment building 34. The primary components housed within the pressure vessel 10 include the primary side of a steam generator, reactor coolant pumps, a pressurizer and the reactor itself. The steam generator system 18 of a conventional reactor, in this integral reactor design, is broken down into two components, a heat exchanger 26 which is located above the upper internals 30 and a steam drum which is maintained external to the containment 34. The steam generator heat exchanger 26 includes the pressure vessel 10/12 rated for primary design pressure and shared by the reactor core 14 and other conventional reactor internal components, two tube sheets 54 and 56, hot leg piping 24 (also referred to as the hot leg riser), heat transfer tubes 58 which extend between the lower tube sheet 54 and the upper tube sheet 56, tube supports 60, secondary flow baffles 36 for directing the flow of the secondary fluid medium among the heat transfer tubes 58 and secondary flow nozzles 44 and 50.

The heat exchanger 26 pressure vessel head 12 assembly is maintained within the containment and is separated from the steam drum pressure vessel (not shown) by the reactor containment wall 34. The external to containment steam drum is comprised of a pressure vessel, rated for secondary design pressure. The external to containment steam drum includes centrifugal type and chevron type moisture separation equipment, a feedwater distribution device and flow nozzles for wet steam, feedwater, recirculating liquid and dry steam, much as is found in a conventional steam generator design.

The flow of the primary reactor coolant through the heat exchanger 26 in the head 12 of the reactor vessel 10 is shown by the arrows in the upper portion of FIG. 3. As shown, heated reactor coolant exiting the reactor core 14 travels up and through the hot leg riser 24, through the center of the upper tube sheet 56 where it enters a hot leg manifold 74 where the heated coolant makes 180° turn and enters the heat transfer tubes 58 which extend through the upper tube sheet 56. The reactor coolant then travels down through the heat transfer tubes 58 that extend through the tube sheet 56 transferring its heat to a mixture of recirculated liquid and feedwater that is entering the heat exchanger through the sub-cooled recirculation input nozzle 50 from the external steam drum, in a counterflow relationship. The sub-cooled recirculating liquid and feedwater that enters the heat exchanger 26 through the sub-cooled recirculation input nozzle 50 is directed down to the bottom of the heat exchanger by the secondary flow baffles 36 and up and around heat exchange tubes 58 and turns just below the upper tube sheet 56 into an outlet channel 76 where the moisture laden steam is funneled to the wet steam outlet nozzle 44. The wet saturated steam is then conveyed to the external steam drum where it is conveyed through moisture separators which separate the steam from the moisture. The separated moisture forms the recirculating liquid which is combined with feedwater and conveyed back to the sub-cooled recirculation input nozzle 50 to repeat the cycle. Thus, in this embodiment, the steam generator heat exchanger 26 is placed above the reactor. The pressurizer is placed in the area 22 above the heat exchanger 26 with a surge separator placed therebetween to provide thermal separation between the pressurizer and the rest of the system and perform the surge function.

The surge separator of this embodiment of the inventions claimed hereafter comprises at least two spaced generally horizontal plates with a plurality of spaced, concentric cylinders extending therebetween and a circuitous fluid flow path extending between the plates and through the area between the concentric cylinders. While the plate structure thermally separates the warmer pressurizer fluid from the reactor coolant system, the flow orifices between the plates and through the circuitous path through and between the plenums formed between the spaced concentric cylinders, equalize a surge resulting from reactor coolant liquid volume changes as a result of changes in reactor coolant temperature. The design provides a passive component that allows an integral pressurizer and surge separator to perform three required functions. Firstly, the separator 38 thermally insulates and isolates two regions of reactor coolant, i.e., the volume within the pressurizer and the volume within the primary side of the steam generator, resulting in a decrease in heat lost from the pressurizer to the reactor coolant system. This results in a decrease in the power requirements for the pressurizer heaters. Secondly, the surge separator 38 provides the necessary flow restriction between the volume of the pressurizer 22 and the remainder of the reactor coolant system to handle surges in volume changes within the reactor coolant system. Lastly, the surge separator decreases the effects of pressurizer oscillations from the reactor coolant pumps.

Figure 4:
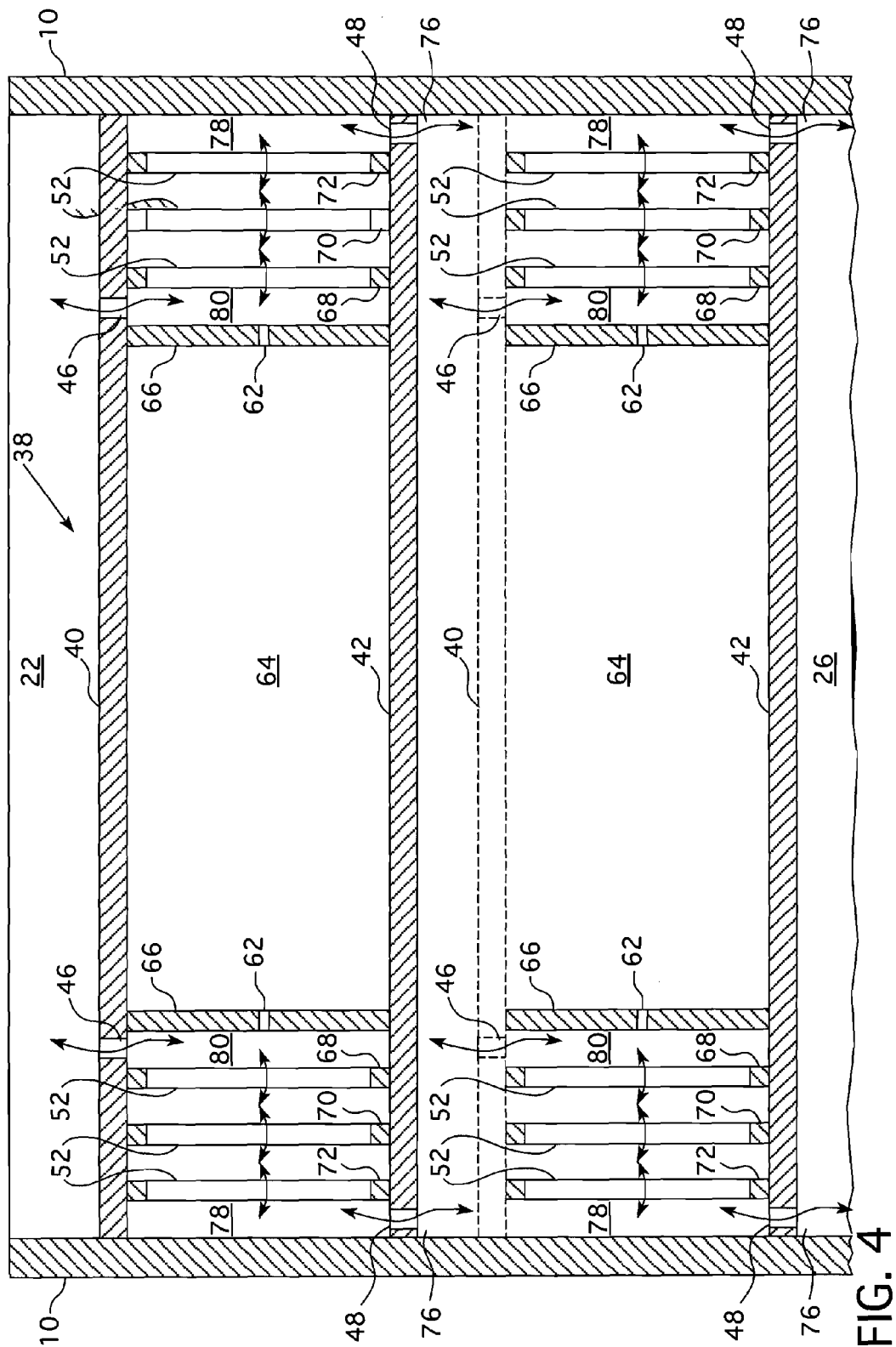
FIG. 4 is a cross-sectional view of one embodiment of the surge separator of this invention.
Figure 5:
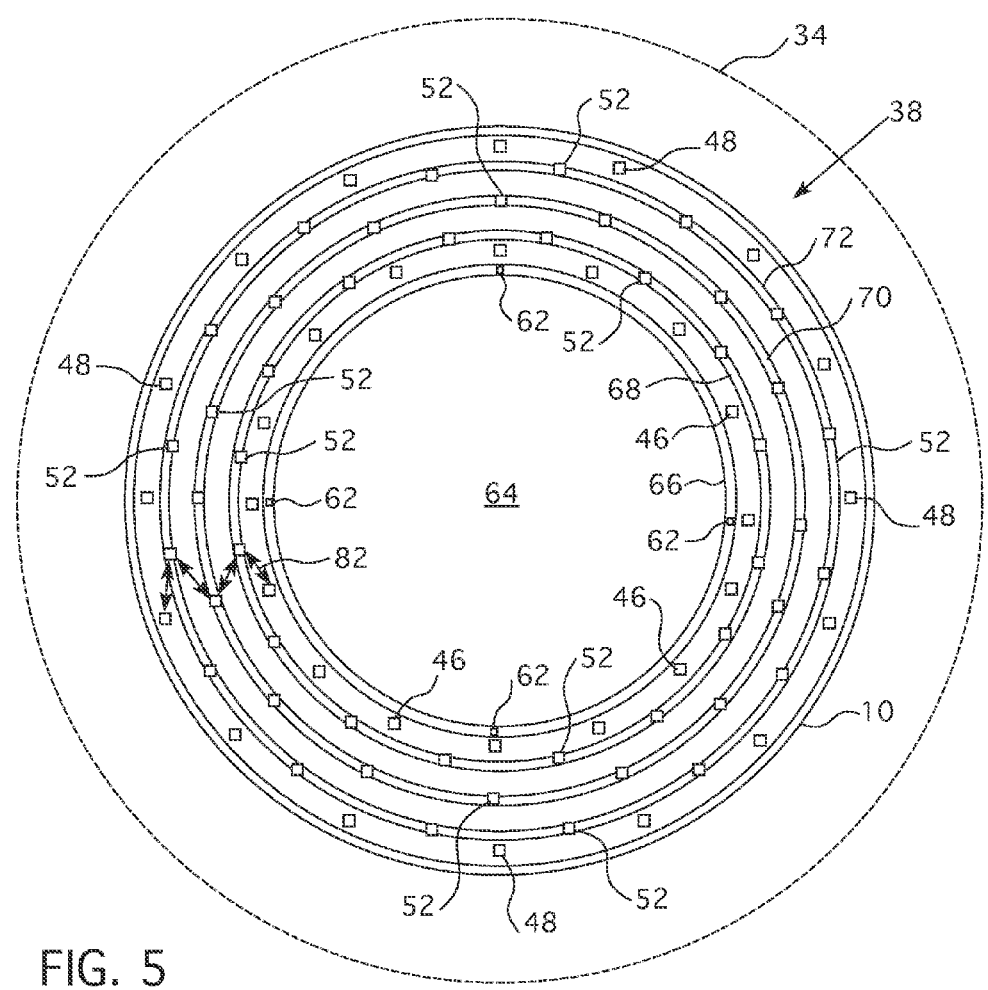
FIG. 5 is a plan view of one embodiment of the surge separator illustrated in FIG. 4 having all of the baffles affixed to one plate.
Figure 6:
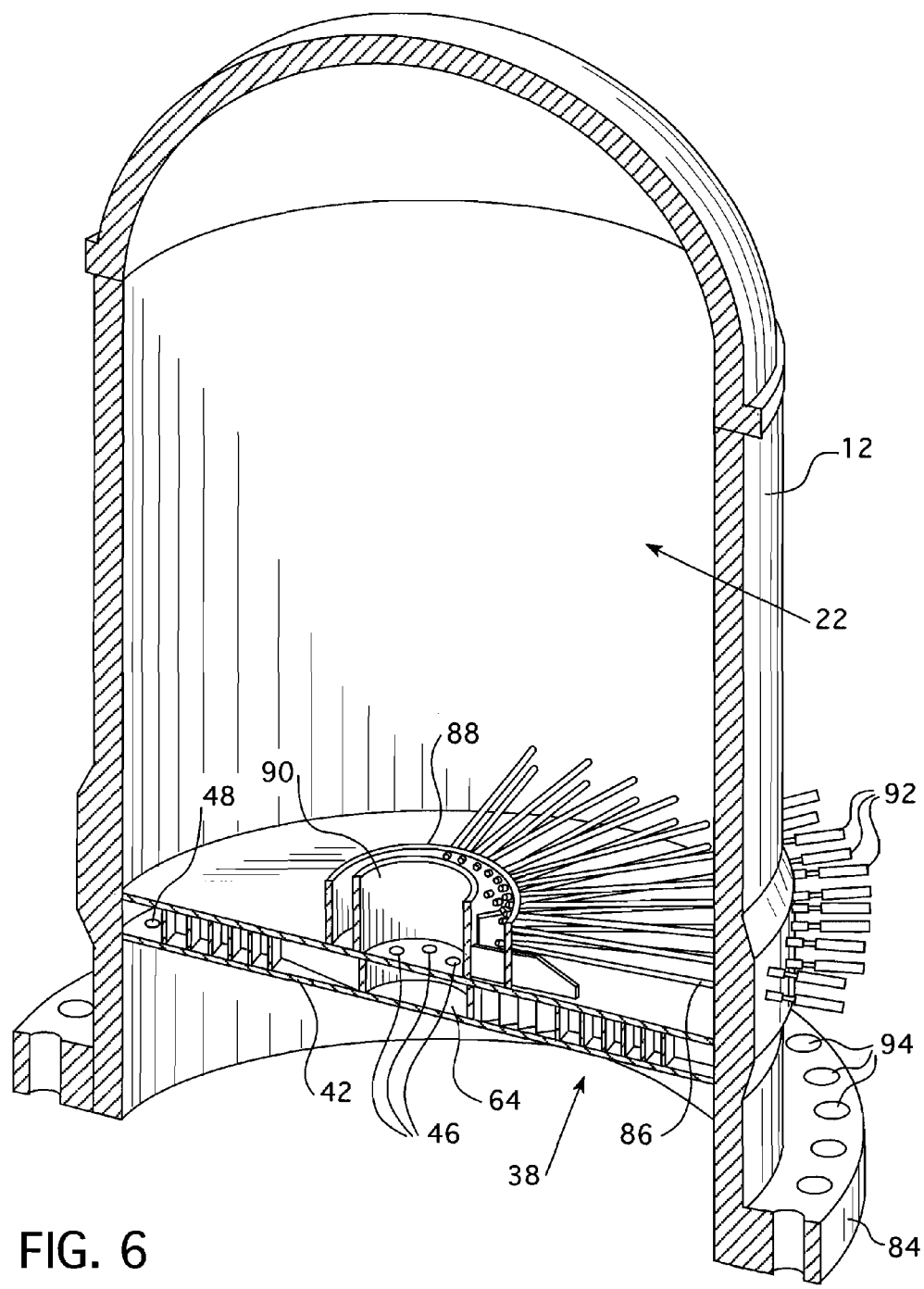
FIG. 6 is a cross-sectional view of an upper portion of the reactor vessel that houses another embodiment of the pressurizer of this invention.

One preferred embodiment of the invention is illustrated in FIGS. 4 and 5. FIG. 4 is a cross sectional view and FIG. 5 is a plan view of the surge separator 38 of this embodiment. This design uses multiple layers of separated steel plates 40, 42 which provide more efficient insulation and results in a lighter assembly. These plates and the concentric cylinders 68, 70 and 72 supported between the plates 40 and 42, include a series of spaced holes 48, 52 and 46 that allow the reactor coolant to pass from one side of the plates 40, 42 to the other, preferably taking a circuitous path. Correctly sized, the holes 48, 52 and 46 provide the required resistance to flow during normal operation, but allow for pressure equalization and flow during thermal transients which result in large changes in reactor coolant system coolant inventory. The holes 48, 52, 46 are preferably spaced as to create a labyrinth which replaces the function of the surge line in a traditional pressurized water reactor.

One or more plate pairs 40, 42 may be used depending upon the hydraulic requirements of the reactor system, two such plate pairs being shown in FIG. 4. The plate pairs 40, 42 may be stacked with the lower plate 42 of one pair forming the upper plate 40 of the pair just below it or a space 76 formed by the phantom upper plate 40 shown in FIG. 4, may be maintained between plate pairs.

More particularly, the surge separator is formed from at least one pair of two spaced, generally horizontal plates, 40 and 42, each having a curved periphery that substantially matches the curvature on the inside wall of the reactor pressure vessel head 12 at the location at which the plate is supported, with each plate substantially spanning the inside diameter of the reactor vessel at the location at which it is supported. A plurality of spaced, concentric cylinders 66, 68, 70 and 72 extend between the spaced plates 40 and 42, with an upper one of the two spaced, generally horizontal plates 40 closing off a top of each cylinder and a lower one of the two spaced, generally horizontal plates 42 closing off a bottom of each cylinder. While four such concentric cylinders are shown in this embodiment, it should be appreciated that the number of such concentric cylinders may vary depending upon the hydraulic requirements of the reactor system. A first coolant flow passage 48 extends through the lower one of the two spaced, generally horizontal plates 42 in a first area 78 generally between the inside wall of the head 12 of the reactor vessel 10 and an outer one of the plurality of spaced, concentric cylinders 72. A second coolant passage 46 extends through the upper one of the two spaced, generally horizontal plates 40 in a second area 80 generally between an innermost one 66 and the one that immediately surrounds the innermost one 68 of the plurality of spaced, concentric cylinders. The coolant then takes a circuitous path through either coolant passage 48 or 46 through the openings 52 within the concentric cylinders 68, 70 and 72 and out through the other of the coolant passage 46 and 48, depending upon the direction of flow.

The inner concentric cylinder 66 surrounds a relatively stagnant pool 64 of coolant with relatively small flow holes 62 provided for equalizing the pressure in the radial space between the remaining concentric cylinders of the stagnant pool 64. The stagnant pool 64 provides the bulk of the thermal insulation between the pressurizer 22 and the heat exchanger 26. Reference character 82 in FIG. 5 shows a preferred circuitous path of coolant flow between the pressurizer 22 and the heat exchanger 26 for the embodiment just described.

Figure 7:
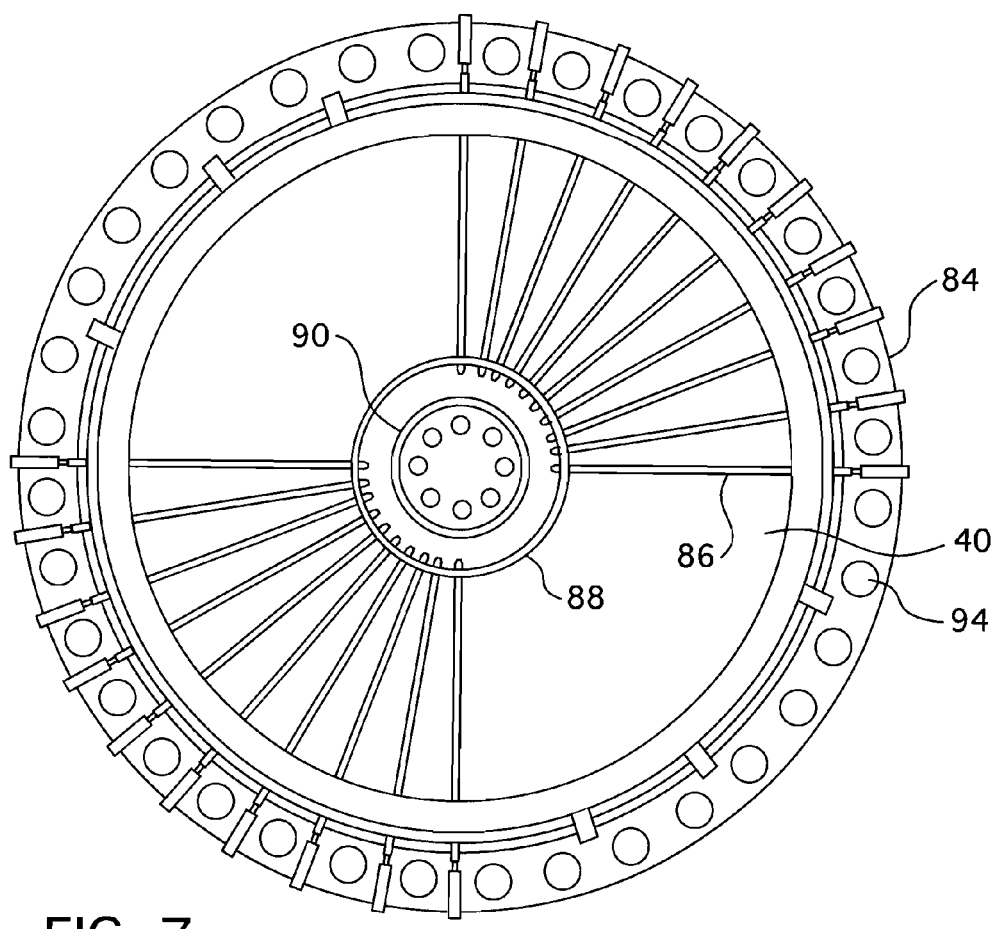
FIG. 7 is a plan view of the upper assembly of the embodiment of the pressurizer shown in FIG. 6.

FIGS. 6-12 show another embodiment of the invention in which the pressurizer heaters 86 are supported from the upper horizontal plate 40 of the surge-line separator 38. The heaters 86 extend radially from an inner cylindrical support wall 88 to the outer wall of the reactor head 12, circumferentially spaced at approximately ten degree intervals, though it should be appreciated that the number of heaters and their spacing will depend on the requirements of the system. The heaters are shown terminated outside the reactor head 12 at electrical connectors 92. The inner cylindrical wall support 88 for the heaters 86 concentrically surrounds a central cylindrical flow guide 90 that funnels the surge flow passing through the holes 46 in the upper plate 40 that, unlike the previous embodiment, communicate with the central stagnant pool 64. The lower portion of the pool 64 is still relatively stagnant to aid in insulating the coolant in the pressurizer from the coolant in the hot leg manifold 74, while the upper portion of the pool 64 forms part of the flow path through the surge-line separator into the pressurizer 22. The central cylindrical flow guide 90 shields the heater elements 86 from the turbulence of the incoming coolant and thus reduces the likelihood of damage to the heater elements. The pressurizer 22, including the surge-line separator is joined to the lower reactor head by a flange 84 which is coupled to the lower reactor head by fasteners which extend through the openings 94. Preferably, the heater elements radially extend between the openings so the fastening of the studs that fit through the openings 94 is not obscured. A plan view of a cross-section of the pressurizer taken above the upper plate 40 is shown in FIG. 7.

Figure 8:
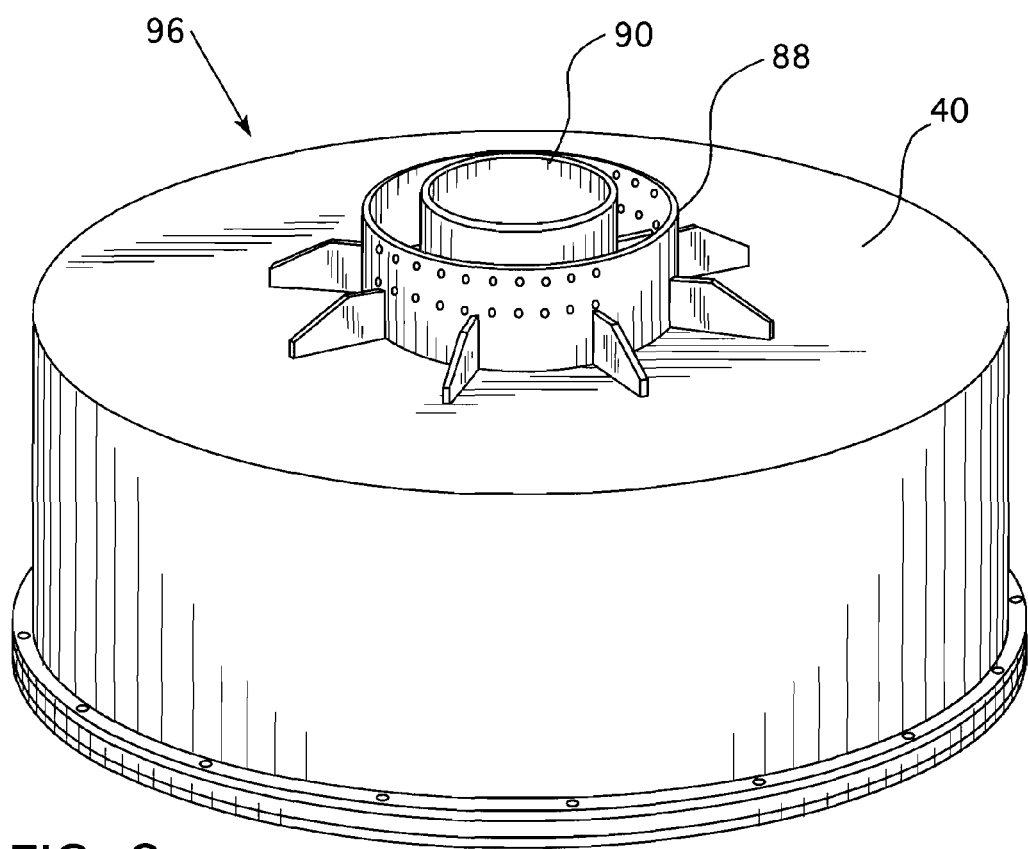
FIG. 8 is a perspective view from above of the upper assembly of the pressurizer illustrated in FIGS. 6 and 7.
Figure 9:
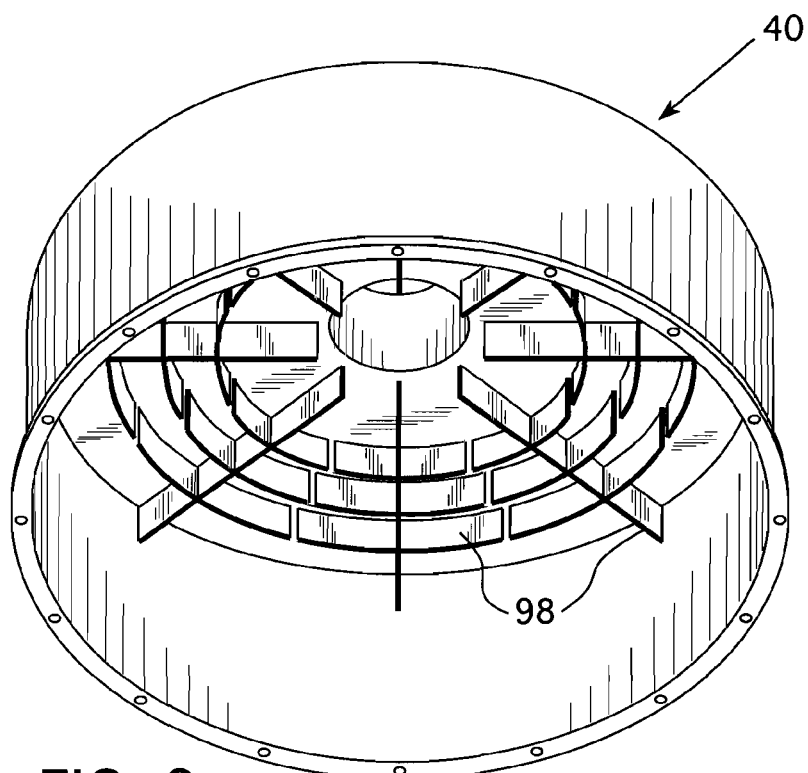
FIG. 9 is a perspective view from below of the upper assembly illustrated in FIG. 8.
Figure 10:
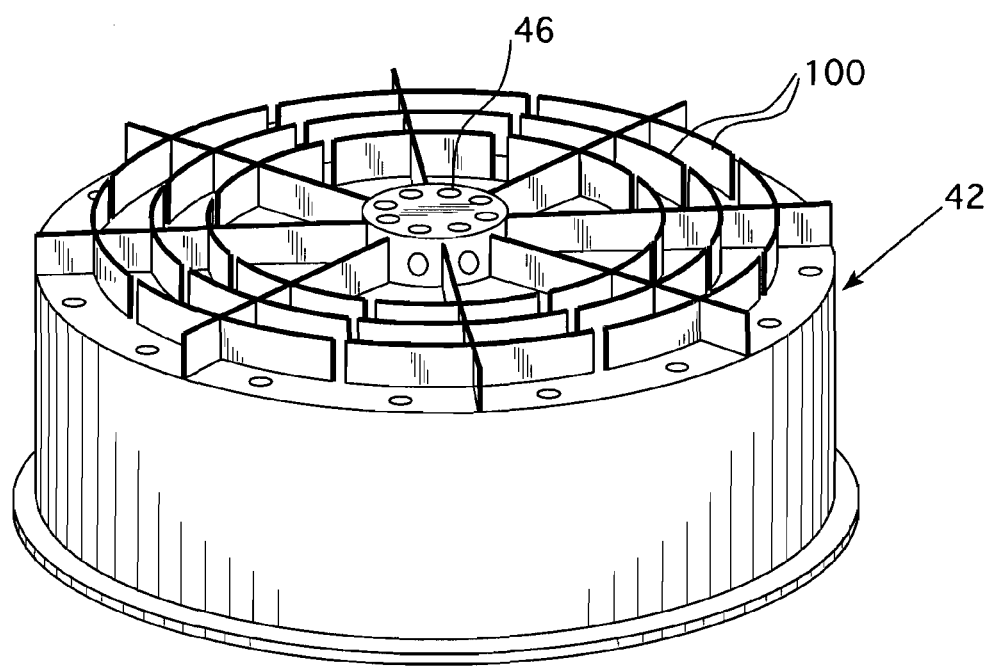
FIG. 10 is a perspective view from above of the lower assembly of the pressurizer illustrated in FIGS. 6 and 7.
Figure 11:
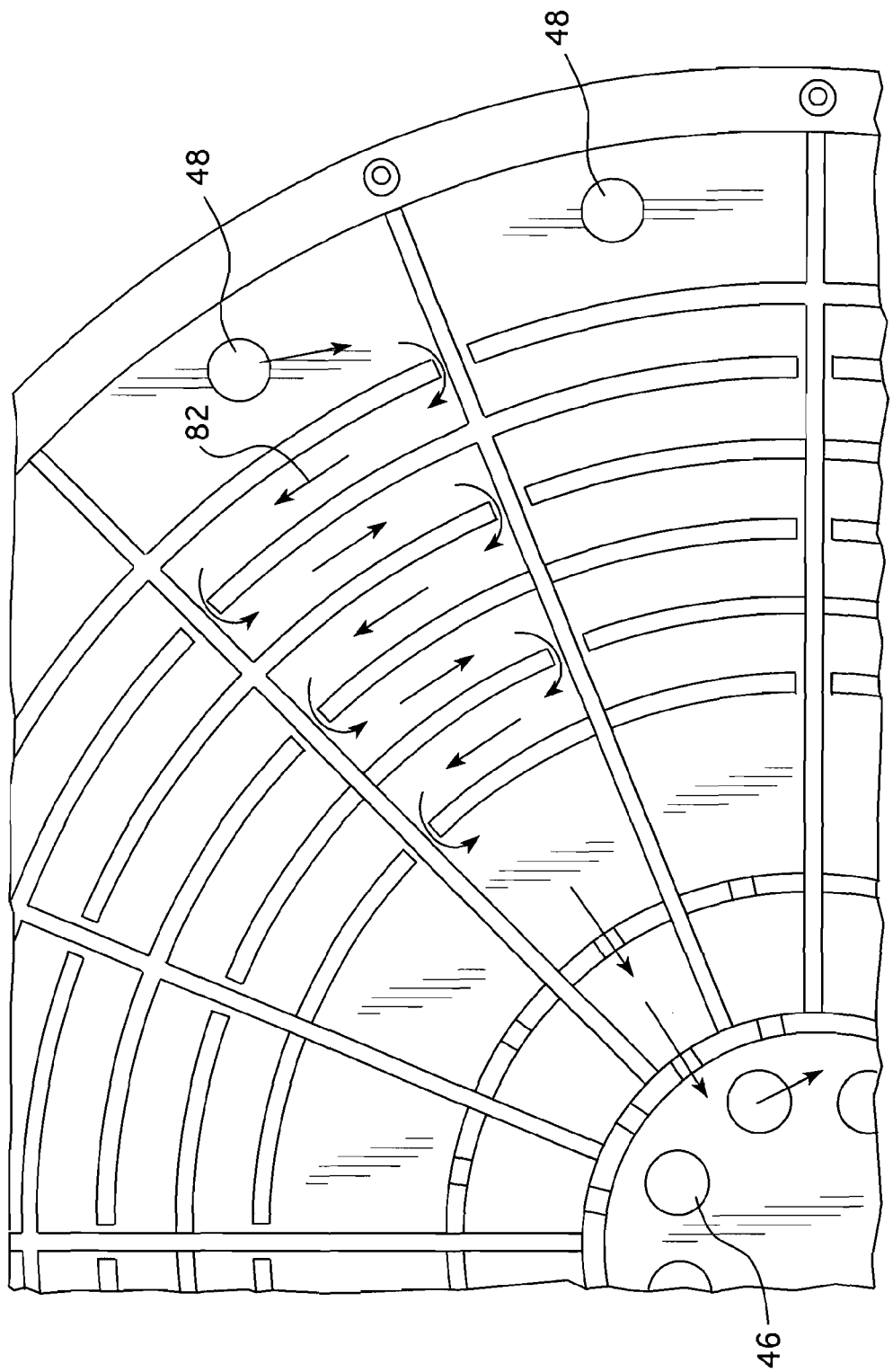
FIG. 11 is a flow diagram showing the circuitous route of the coolant through the baffles of the pressurizer surge line separator embodiment shown in FIGS. 6 and 7.
Figure 12:
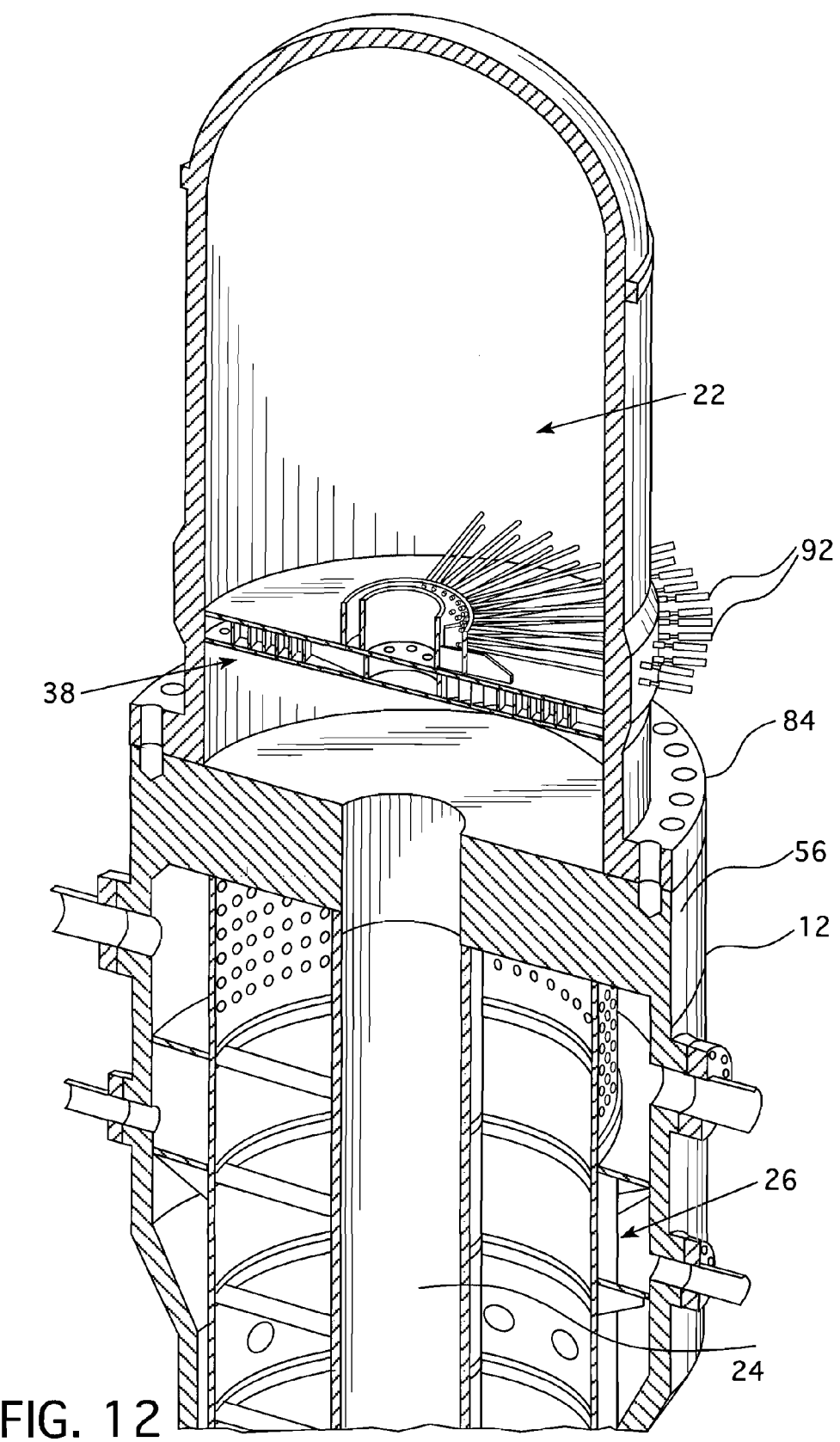
FIG. 12 is a sectional view of the in-vessel portion of the steam generator with the pressurizer of the embodiment shown in FIGS. 6 and 7 supported above the upper tube sheet.

FIGS. 8-10 show the construction of the upper and lower plate 40, 42 assembly of this embodiment with a perspective view of the upper plate 40 from above shown in FIG. 8 and a perspective view of the upper plate from below shown in FIG. 9. The upper horizontal plate 40 of the surge separator 38 is formed as part of an outer top hat 96 that, as can be observed from FIG. 8, is supported at the reactor head upper flange 84 above the steam generator upper tube sheet 56. The circuitous flow path 82 is formed from a number of radially extending and circumferentially extending baffles 98 that are supported from the underside of the upper horizontal plate 40 which are interleaved with complimentary baffles 100 supported on the top side of the lower support plate 42 as shown in FIG. 10. The upper plate assembly 40 fits over the lower plate assembly 42 to complete the circuitous path. The circuitous flow path is shown in FIG. 11 and FIG. 12 shows the entire pressurizer assembly 22 installed in the reactor head 12 above the heat exchanger 26 of the integral steam generator.

Thus, the surge line separator of this invention, one or more embodiments of which were just described, will occupy only a small volume within the pressure boundary of the integral reactor pressure vessel while efficiently isolating the pressurizer plenum from the remainder of the reactor coolant system and limiting heat lost from the pressurizer to the remainder of the reactor coolant system. The invention allows for pressure equalization and flow between the pressurizer and the remainder of the reactor coolant system and compensates for rapid changes in reactor coolant system liquid volume, including those caused by the reactor coolant pumps. Support structures, i.e., the radial plates and concentric cylinders, between the horizontal plates increases the strength of the plates for the pressure difference that will be experienced.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

What is claimed is:

1. An integral nuclear reactor having a reactor pressure vessel housing a primary coolant flow path, a pressurizer and a surge line separator separating the pressurizer from the primary coolant flow path, the surge line separator comprising:
   two spaced, generally horizontal, substantially flat plates each having a curved periphery that is supported in an upper portion of the reactor pressure vessel with each plate substantially spanning an inside diameter and extending around an inner circumference of the reactor pressure vessel and enclosed around a periphery of the two spaced, generally horizontal plates by an outer wall;
   a plurality of radially spaced, curved, concentric baffles extending over an arc of 360 degrees or less, are situated between the spaced, generally horizontal, substantially flat plates and are respectively affixed to one or the other of the two spaced, generally horizontal, substantially flat plates, with substantially all of the baffles in contact with both spaced, generally horizontal plates;
   a first coolant passage through the lower one of the two spaced, generally horizontal plates in a first area generally proximate one of either a center or the periphery of the lower one of the two spaced, generally horizontal plates;
   a second coolant passage through the upper one of the two spaced, generally horizontal plates in a second area generally proximate the other of either a center or the periphery of the upper one of the two spaced, generally horizontal plates; and
   at least some of the plurality of baffles, radially spaced from the outer wall and radially adjacent each other, respectively have a plurality of circumferentially spaced, substantially radially directed coolant passages configured so that the radially directed coolant passages in the adjacent baffles are circumferentially offset from one another, to define a circuitous coolant flow path between the first coolant passage and the second coolant passage.

2. The integral nuclear reactor of claim 1 wherein the second coolant passage through the upper one of the two spaced, generally horizontal plates comprises a plurality of second coolant passages that are circumferentially offset from an adjacent radially directed coolant passage.

3. The integral nuclear reactor of claim 1 wherein an inner one of the plurality of baffles substantially surrounds a generally stagnant pool of coolant, relative to the flow between the first area and the second area.

4. The integral nuclear reactor of claim 3 including one or more radially directed coolant passages through a wall of the inner one of the plurality of baffles.

5. The integral nuclear reactor of claim 1 wherein the surge line separator comprises a plurality of pairs of the two spaced, generally horizontal, substantially flat plates with a set of the plurality of radially spaced, curved concentric baffles extending between the two spaced, generally horizontal, substantially flat plates of each pair, with the pairs of spaced, generally horizontal plates arranged in tandem.

6. The integral nuclear reactor of claim 5 wherein the lower one of the two spaced, generally horizontal, substantially flat plates of one pair forms the upper one of the two spaced, horizontal, substantially flat plates of a second pair.

7. The integral nuclear reactor of claim 1 wherein substantially all of the baffles are attached to only one of the two spaced, generally horizontal, substantially flat plates.

8. The integral nuclear reactor of claim 1 including a plurality of circumferentially spaced, radially extending heater assemblies which are supported from an upper side of the upper one of the two spaced, generally horizontal, substantially flat plates.

9. The integral nuclear reactor of claim 8 including a circumferential separation flange at or below the upper one of the two, spaced, generally horizontal, substantially flat plates, wherein the flange is sealed by a plurality of axially extending, circumferentially spaced fasteners and the heater assemblies respectively extend between pairs of the fasteners.

10. The integral nuclear reactor of claim 1 including a sealed manway substantially in the center of the upper one of the two spaced, generally horizontal, substantially flat plates.

11. The integral nuclear reactor of claim 1 wherein the reactor pressure vessel includes a lower reactor pressure vessel and an upper reactor pressure vessel head, wherein the upper reactor pressure vessel head includes an upper section and a lower section that are connected by a reactor pressure vessel head upper flange and wherein the reactor pressure vessel upper flange supports the surge line separator.

12. The integral nuclear reactor of claim 11 wherein a portion of the surge line separator is captured between a lower and upper lip of the upper reactor pressure vessel flange.

\* \* \* \* \*